US00RE45429E

(19) United States
(12) Reissued Patent
Ling et al.

(10) Patent Number: US RE45,429 E
(45) Date of Reissued Patent: Mar. 24, 2015

(54) COMBINATION LOCK HAVING A SECOND LOCK MECHANISM

(75) Inventors: Renny Tse-Haw Ling, Chung-Ho (TW); Chun Sheng Wu, Chung-Ho (TW)

(73) Assignee: Sinox Co., Ltd., Chung-Ho (TW)

(21) Appl. No.: 12/656,626

(22) Filed: Feb. 4, 2010

Related U.S. Patent Documents

Reissue of:
(64) Patent No.: 6,912,880
Issued: Jul. 5, 2005
Appl. No.: 10/708,367
Filed: Feb. 26, 2004

(30) Foreign Application Priority Data

Oct. 6, 2003 (TW) ..... 92217872 U

(51) Int. Cl.
*E05B 65/48* (2006.01)
*E05B 37/02* (2006.01)

(52) U.S. Cl.
CPC . *E05B 37/02* (2013.01); *Y10S 70/63* (2013.01)
USPC .... 70/71; 70/284; 70/285; 70/74; 70/DIG. 63

(58) Field of Classification Search
USPC ..... 70/21, DIG. 63, 284, 285, 68–72, 74
See application file for complete search history.

(56) References Cited

U.S. PATENT DOCUMENTS

| | | | | | |
|---|---|---|---|---|---|
| 1,377,737 | A * | 5/1921 | Stosech | 70/284 |
| 3,347,069 | A * | 10/1967 | Hollingshead, Jr. | 70/63 |
| 3,408,839 | A * | 11/1968 | Walters | 70/285 |
| 3,750,431 | A * | 8/1973 | Atkinson | 70/21 |
| 4,290,286 | A * | 9/1981 | Rae | 70/285 |
| 4,499,745 | A * | 2/1985 | Ricouard et al. | 70/285 |
| 4,557,122 | A * | 12/1985 | Hwang | 70/312 |
| 4,671,088 | A * | 6/1987 | Jeang | 70/312 |
| 5,237,842 | A * | 8/1993 | Rasch et al. | 70/285 |
| 5,485,734 | A * | 1/1996 | Yang | 70/285 |
| 5,557,954 | A * | 9/1996 | Ling | 70/68 |
| 6,792,778 | B1 * | 9/2004 | Chen | 70/21 |

* cited by examiner

*Primary Examiner* — William Doerrler
(74) *Attorney, Agent, or Firm* — Opes Law, P.C.; Laurence Kao

(57) ABSTRACT

A combination lock having a combination lock mechanism and a key lock mechanism. The combination lock mechanism is able to unlock and lock the combination lock by switching a plurality of dials exposed on the surface of the combination lock, while the key lock mechanism allows the user to unlock the combination lock with a key.

15 Claims, 18 Drawing Sheets

COMBINATION LOCK HAVING A SECOND LOCK MECHANISM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF INVENTION

1. Field of the Invention

The present invention relates to a combination lock having a second lock mechanism, and more particularly, to a combination lock combining a combination lock mechanism with a key lock mechanism for securing a zipper.

2. Description of the Prior Art

In U.S. Pat. No. 5,557,954, a zipper lock positioned on one side of a zipper for locking a pull tab of the zipper is disclosed. The above-mentioned zipper lock has a combination lock mechanism. The combination lock mechanism includes a plurality of dials exposed on one side of the zipper lock. By switching the dials, the combination lock mechanism is therefore locked or unlocked. The advantage of the combination lock is that the user can unlock it without any special tools or keys as long as he remember the combination code. However, if the user forgets the combination code, the zipper lock can only be unlocked through trial and error, or by destructive means.

It can be seen that the combination lock mechanism is convenient. However, it is also annoying if the user forgets the combination code.

SUMMARY OF INVENTION

It is therefore a primary objective of the claimed invention to improve the disadvantage of the combination lock mechanism.

According to the claimed invention, a combination lock having a second lock mechanism is disclosed. The combination lock of the present invention combines a combination lock mechanism with a key lock mechanism. The combination lock mechanism is able to unlock and lock the combination lock, while the key lock mechanism allows the user to unlock the combination lock with a key.

These and other objectives of the present invention will no doubt become obvious to those of ordinary skill in the art after having read the following detailed description of the preferred embodiment that is illustrated in the various figures and drawings.

DETAILED DESCRIPTION

Figure 1:
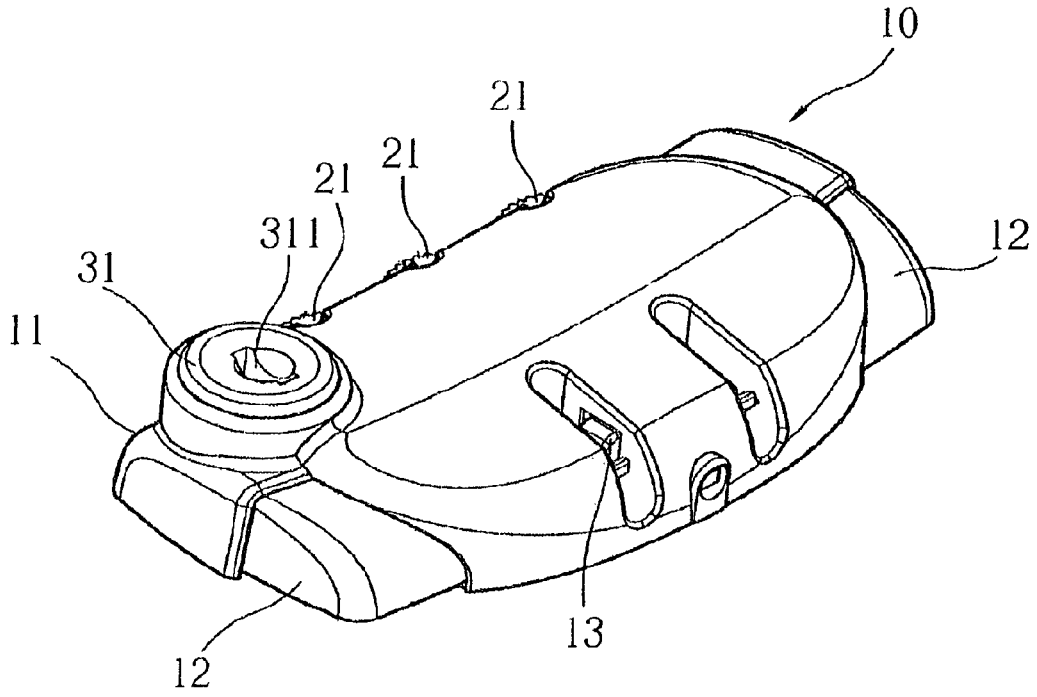
FIG. 1 is a schematic diagram illustrating a lock of the present invention.
Figure 2:
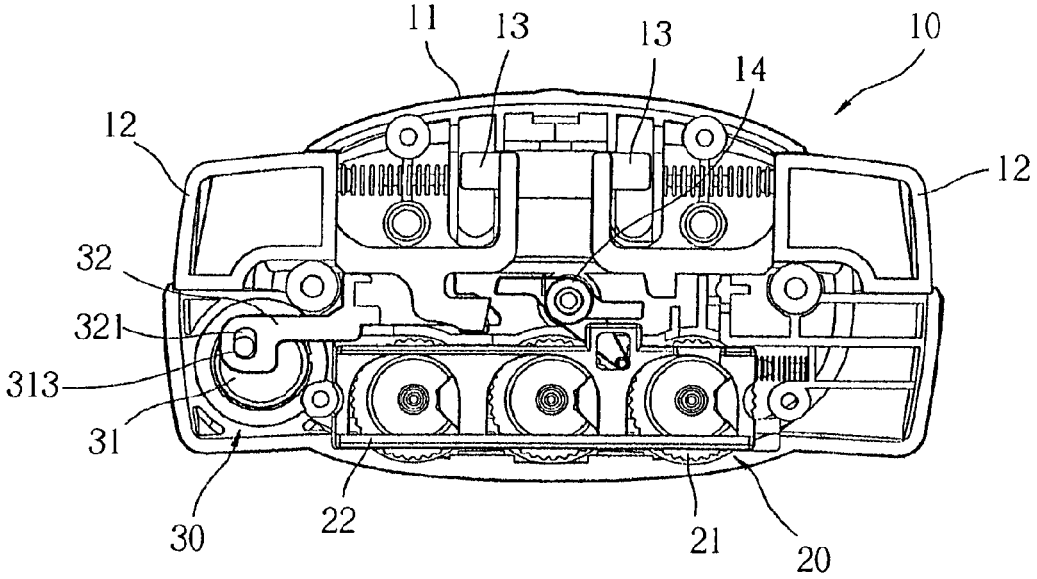
FIG. 2 and FIG. 3 are exploded views of the lock shown in FIG. 1.
Figure 3:
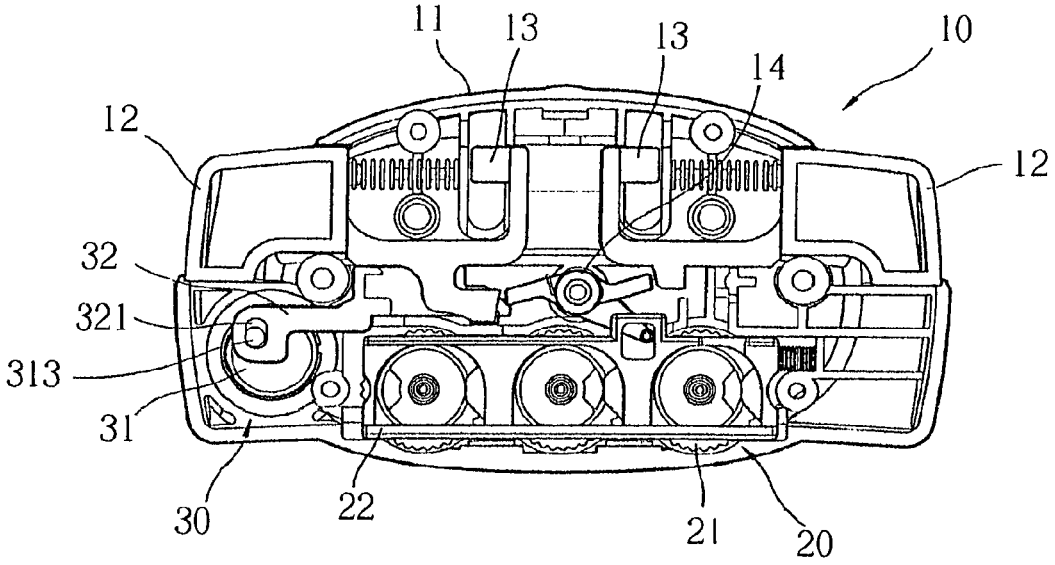

Please refer to FIG. 1 to FIG. 3. FIG. 1 is a schematic diagram illustrating a lock of the present invention; FIG. 2 and FIG. 3 are exploded views of the lock shown in FIG. 1. As shown in FIG. 1 to FIG. 3, the lock includes a lock body 10, a first lock mechanism 20 and a second lock mechanism 30. The first lock mechanism 20 is a combination lock mechanism, while the second lock mechanism 30 is a key lock mechanism.

The lock body 10 includes a lock housing 11, two push-buttons 12, and a lock tongue 13. The push-buttons 12 and the lock tongue 13 are in relation with each other and are positioned in the lock housing 11. The push-buttons 12 can be depressed by a force, such as by fingers, so that the lock tongue 13 is shifted to a locking position (as shown in FIG. 2) or a releasing position (as shown in FIG. 3).

In addition, the lock body 10 further includes a stopping member 14. The stopping member 14 can make a linear movement or a rotary movement relative to the lock housing 11. The stopping member 14 can be shifted to a first position for constraining the lock tongue 13 in the locking position (as shown in FIG. 3), or the stopping member 14 can be shifted to a second position for releasing the constraint of the lock tongue 13 (as shown in FIG. 2).

The first lock mechanism 20 is a combination lock mechanism including a plurality of dials 21 and a shifting plate 22 positioned in the lock body 10. The shifting plate 22 can be shifted to an unlocking position (as shown in FIG. 2) or a locking position (as shown in FIG. 3) by switching the plurality of dials 21. The shifting plate 22 and the stopping member 14 operate interactively. When the shifting plate 22 is shifted toward the locking position, the stopping member 14 will be moved correspondingly to the first position so that the lock tongue 13 is constrained. On the other hand, when the shifting plate 22 is shifted back to the unlocking position, the stopping member 14 will be moved correspondingly *to the second position* to release the constraint of the lock tongue 13.

Since the technology of combination lock mechanism is well known, further details are not repeated here. Comparing to the conventional combination lock, the present invention includes a second lock mechanism 30. The second lock mechanism 30 allows the lock of the present invention to be unlocked in an alternative way. In such case, the lock of the present invention can be locked by the first lock mechanism 20, but can be unlocked by both the first lock mechanism 20 and the second lock mechanism 30.

The second lock mechanism 30 includes a sleeve 31 and a linking member 32 in relation with each other. The sleeve 31 further includes a keyhole 311 for allowing a key "K" to be inserted and for being rotated by the key "K" such that the linking member 32 is shifted and forces the stopping member 14 to change positions.

Figure 4:
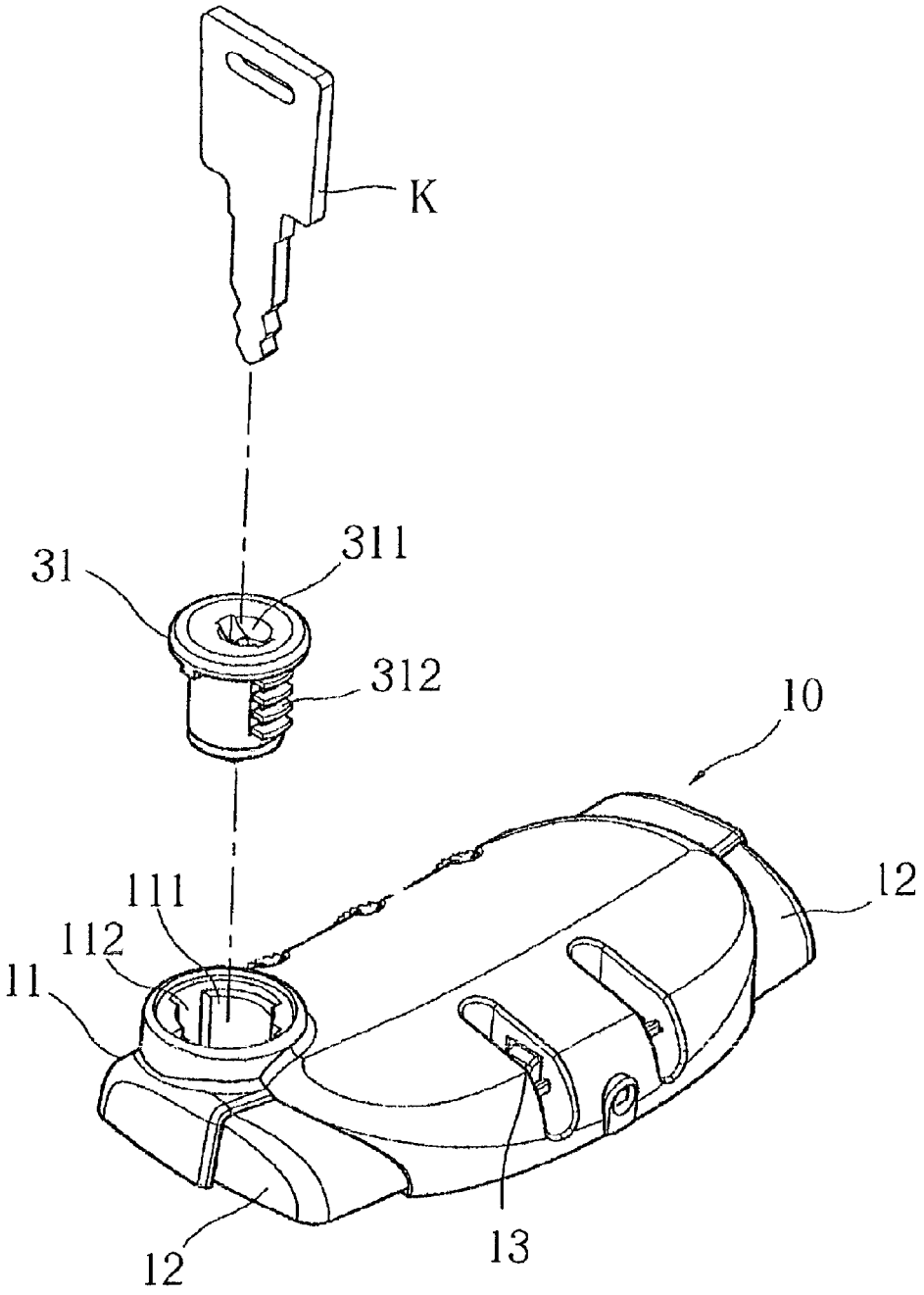
FIG. 4 is an exploded view of a sleeve and a lock housing shown in FIG. 1.

When the key "K" is not inserted into the keyhole 311, the sleeve 31 and the lock housing 11 are not allowed to move. Once the key "K" is inserted into the keyhole 311, the sleeve 31 is free to rotate relative to the lock housing 11. Please refer to FIG. 4. FIG. 4 is an exploded view of the sleeve 31 and the lock housing 11. The sleeve 31 includes a plurality of discs 312 which protrude out of the sleeve 31 in normal condition. Accordingly, the lock housing 11 includes a cavity 111 having a groove 112 for containing the discs 312. In such case, the sleeve 31 is not free to rotate since the discs 312 are inserted into the groove 112. When the key "K" is inserted into the keyhole 311, the discs 312 are drawn back, and the sleeve 31 is free to rotate relative to the lock housing 11.

Figure 5:
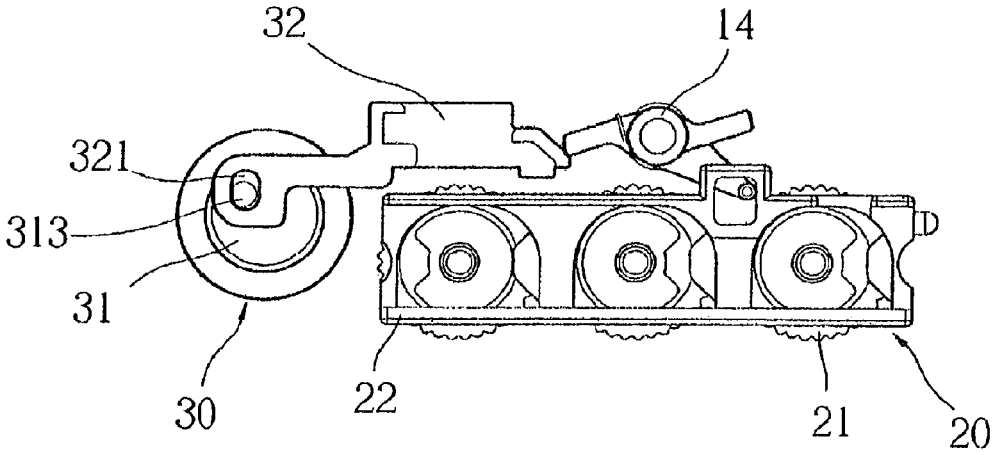
FIG. 5 to FIG. 18 are schematic diagrams illustrating different embodiments of the present invention.
Figure 6:
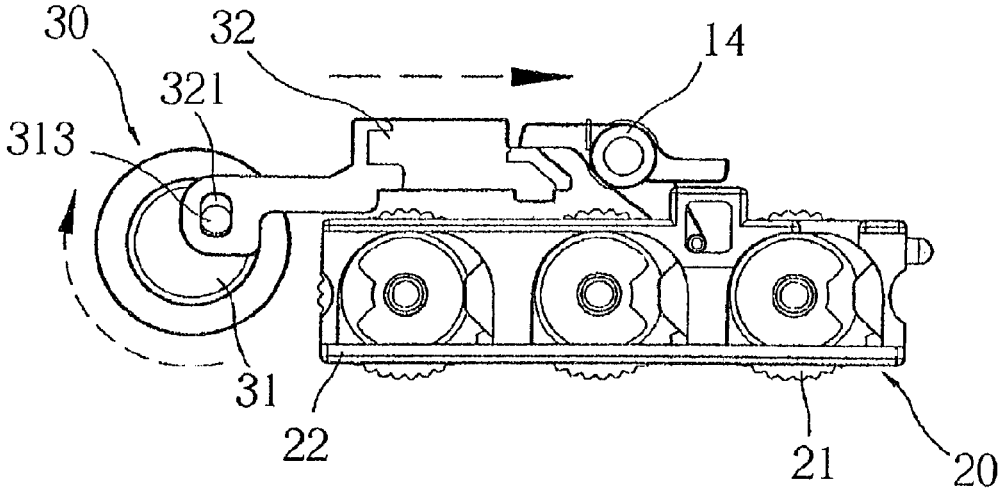

The sleeve 31 further includes a protrusion 313, while the linking member 32 includes a long hole 321 for receiving the protrusion 313. Please refer to FIG. 5 and FIG. 6. FIG. 5 and FIG. 6 are schematic diagrams showing how the sleeve 31 and the linking member 32 interact. As shown in FIG. 5 and FIG.

6, the protrusion 313 is in an eccentric position of the long hole 321 such that the linking member 32 will move linearly when the sleeve 31 rotates. When the stopping member 14 is driven by the shifting plate 22 to shift to the first position, the linking member 32 is able to shift the stopping member 14 to the second position so that the constraint of the lock tongue 13 is released.

Therefore, the unlocking action of the lock can be performed by utilizing either the combination lock mechanism or the key lock mechanism.

Figure 7:
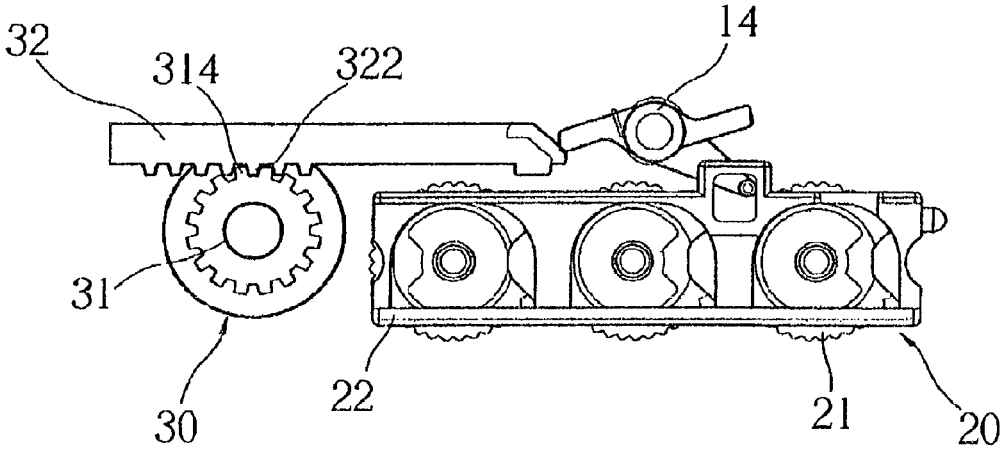
Figure 8:
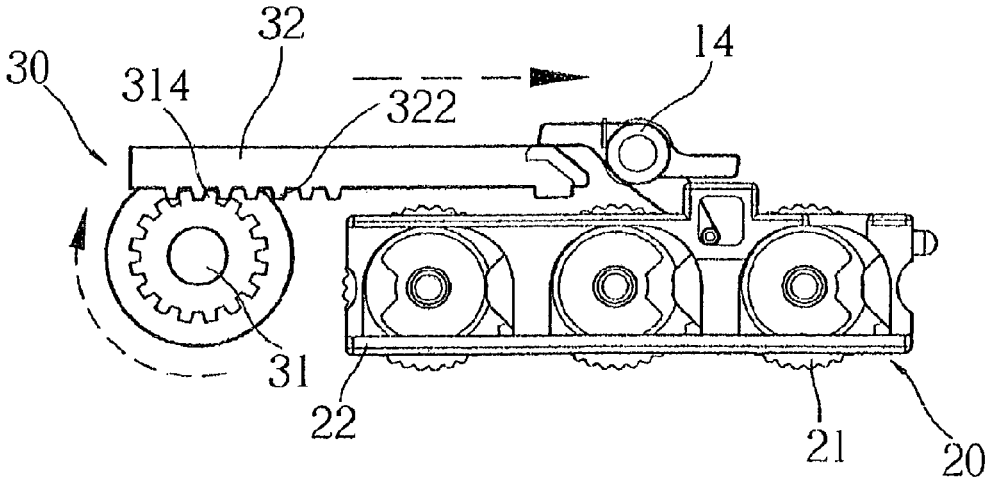

Please refer to FIG. 7 and FIG. 8. FIG. 7 and FIG. 8 are schematic diagrams illustrating another embodiment of the present invention. As shown in FIG. 7 and FIG. 8, the sleeve 31 and the linking member 32 respectively have gears 314 and 322 meshing with each other. Therefore, the sleeve 31 and the linking member 32 operate by means of mesh transmission.

Figure 9:
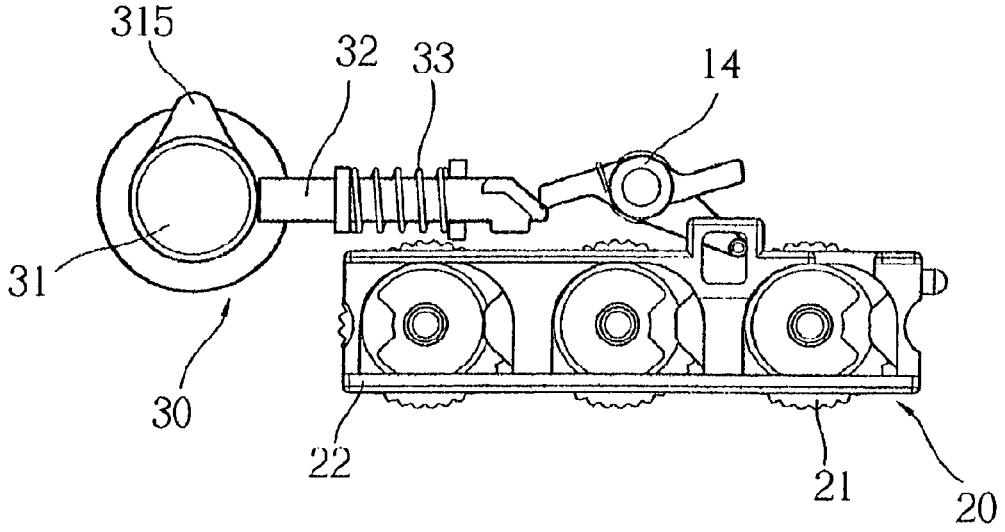
Figure 10:
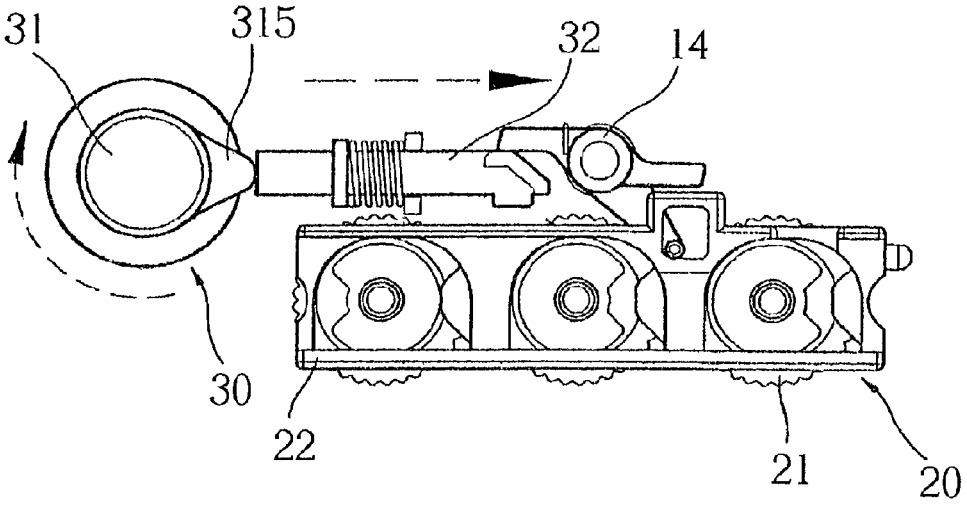

Please refer to FIG. 9 and FIG. 10. FIG. 9 and FIG. 10 are schematic diagrams illustrating another embodiment of the present invention. As shown in FIG. 9 and FIG. 10, the sleeve 31 has a cam 315 connected to the linking member 32 so that the sleeve 31 and the linking member 32 are operated correspondingly. In this embodiment, the linking member 32 further includes a resilient member 33 for providing the linking member 32 with a recovering ability such that the linking member 32 and the cam 315 remain in contact.

Figure 11:
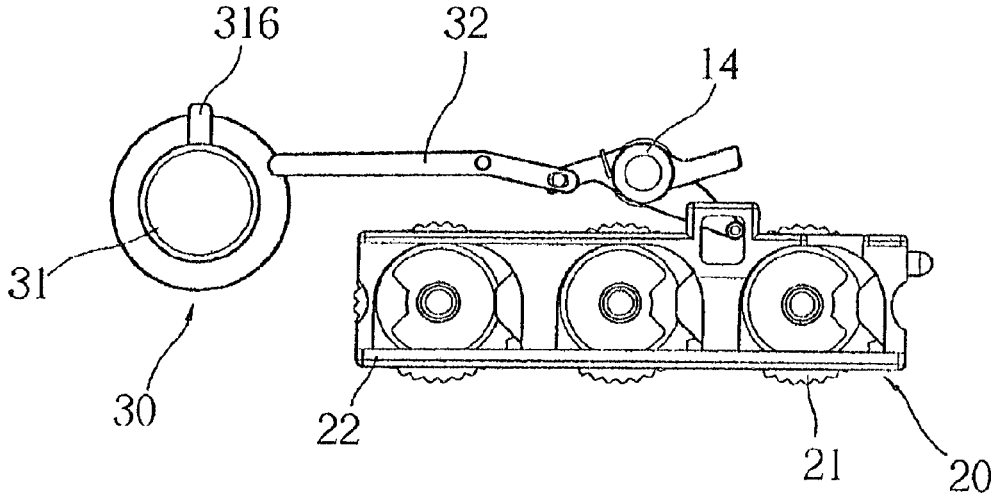
Figure 12:
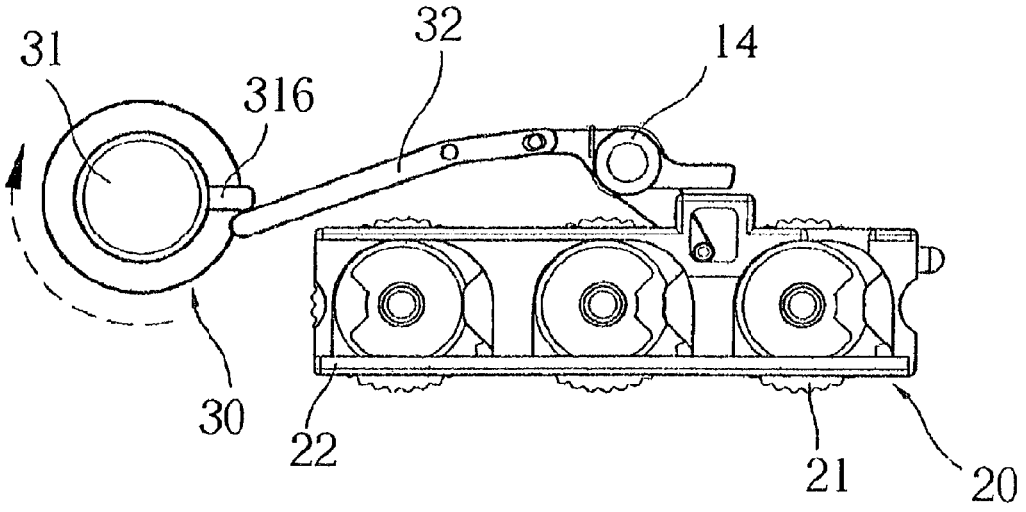

Please refer to FIG. 11 to FIG. 12. FIG. 11 and FIG. 12 are schematic diagrams illustrating another embodiment of the present invention. As shown in FIG. 11 and FIG. 12, the linking member 32 is pivotally connected to the lock housing 11, and the sleeve 31 includes a lever 316. The lever 316 triggers one end of the linking member 32, and thereby the opposite end of the linking member 32 forces the stopping member 14 to the second position. It is worth noticing that the linking member 32 and the stopping member 14 can be connected to each other. For example, as shown in FIG. 11 and FIG. 12, the linking member 32 is connected to the eccentric position of the stopping member 14.

Figure 13:
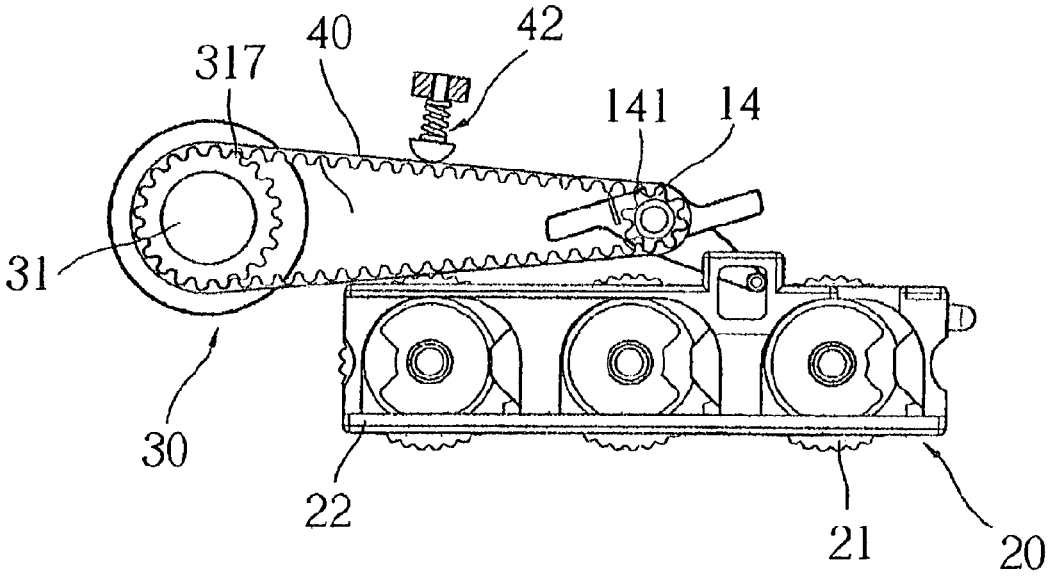
Figure 14:
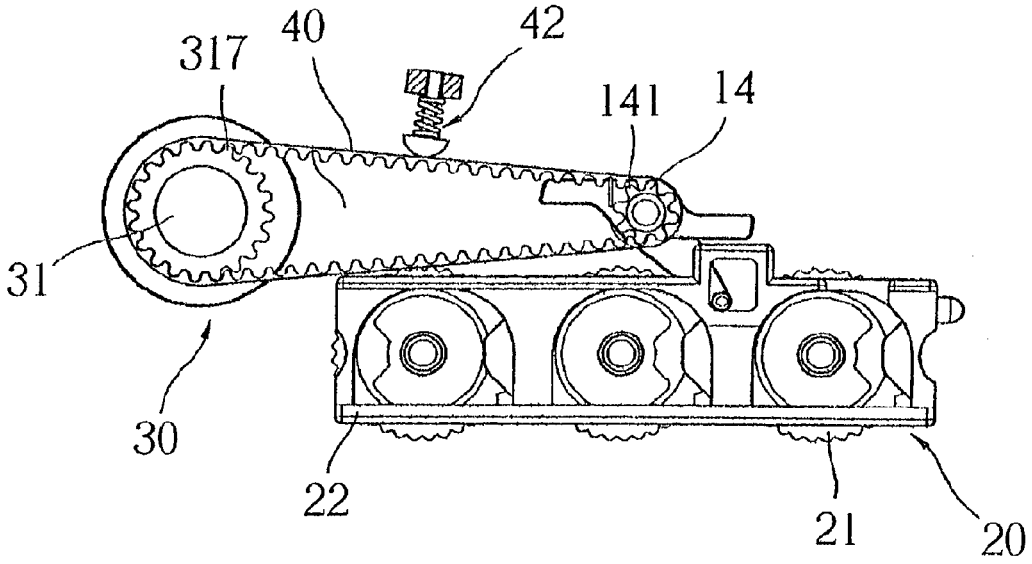

Please refer to FIG. 13 and FIG. 14. FIG. 13 and FIG. 14 are schematic diagrams illustrating another embodiment of the present invention. As shown in FIG. 13 and FIG. 14, the sleeve 31 and the stopping member 14 can be connected by means of a flexible transmission member 40. The flexible transmission member 40 is a circular member, such as a belt, a rack, or a chain, connected to both the sleeve 31 and the stopping member 14. Therefore, the sleeve 31 and the stopping member 14 are moved by frictional force. In addition, if the sleeve 31, the stopping member 14, and the flexible transmission member 40 include respective gears 317, 141, and gear teeth 41, then the sleeve 31 and the stopping member 14 can be moved by means of mesh transmission. Further, the flexible transmission member 40 can be modulated by a tension modulator 42 for adjusting the tightness.

Figure 15:
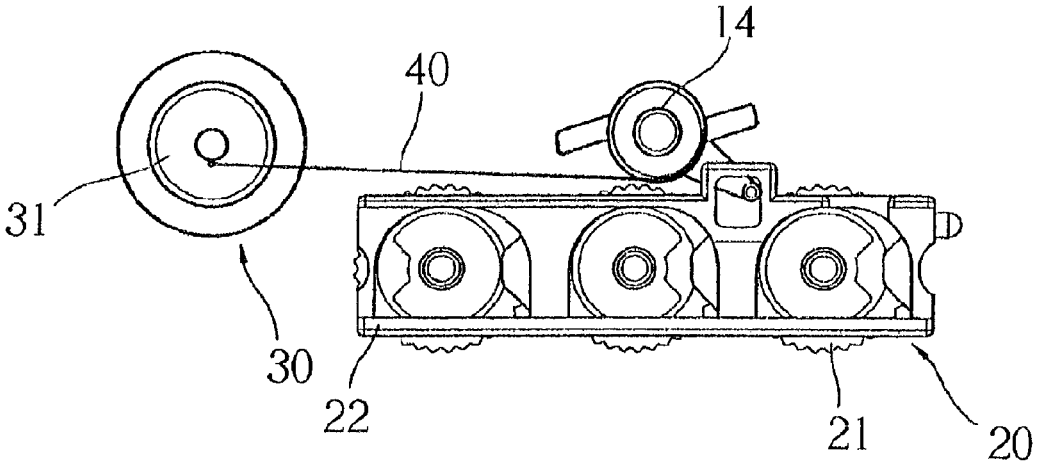
Figure 16:
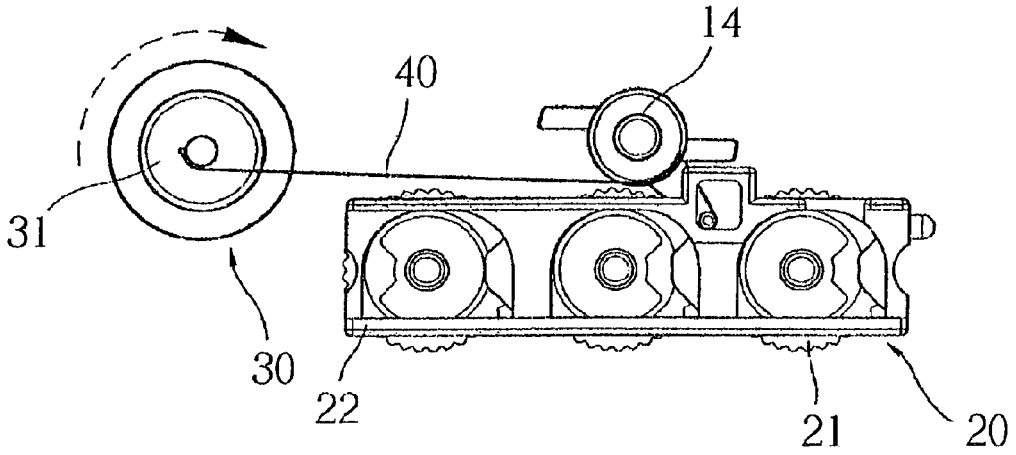

Please refer to FIG. 15 and FIG. 16. FIG. 15 and FIG. 16 are schematic diagrams illustrating another embodiment of the present invention. As shown in FIG. 15 and FIG. 16, the flexible transmission member 40 can also be a linear belt connected to both the sleeve 31 and the stopping member 14.

Figure 17:
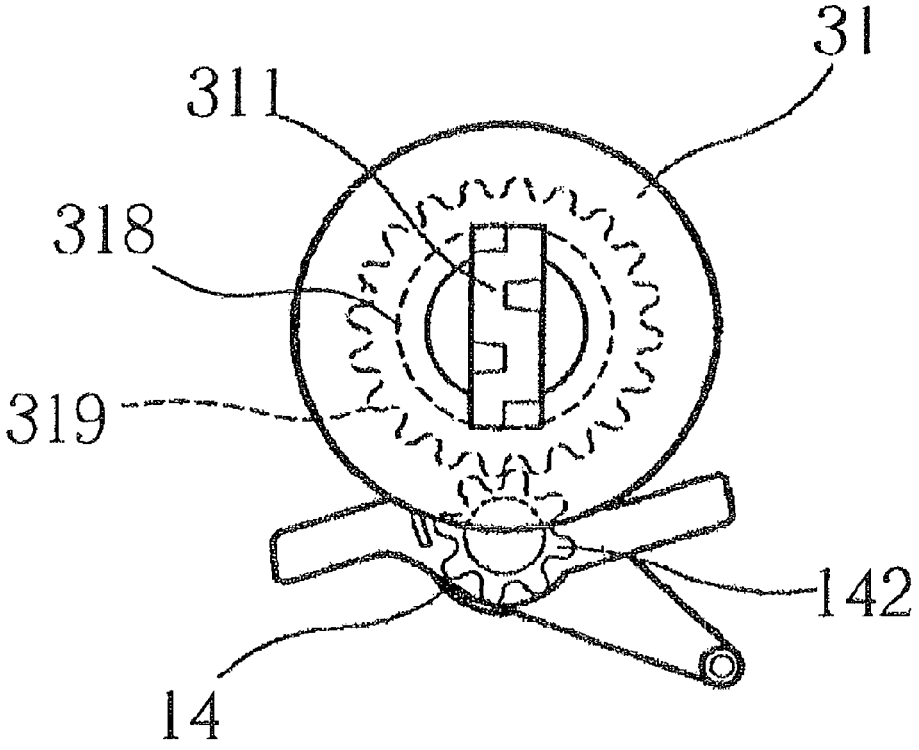
Figure 18:
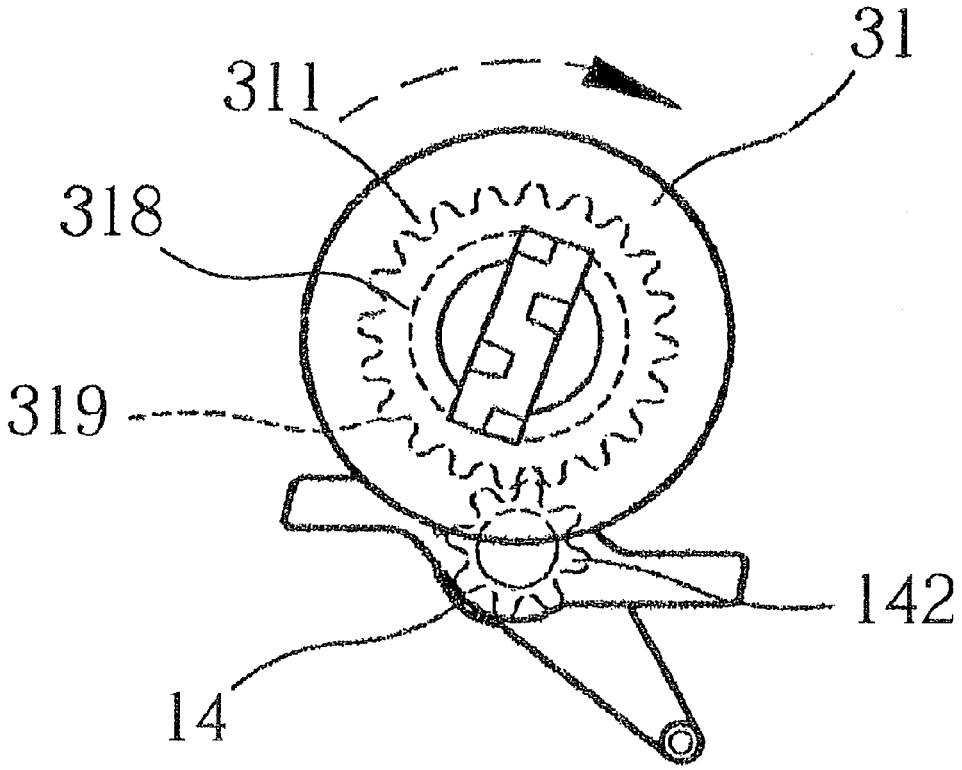

Please refer to FIG. 17 and FIG. 18. FIG. 17 and FIG. 18 are schematic diagrams illustrating another embodiment of the present invention. Differing from the other embodiments, the stopping member 14 is triggered directly by the sleeve 31 in this embodiment. As shown in FIG. 17 and FIG. 18, the sleeve 31 includes an extension part 318 rotating simultaneously with the sleeve 31 and triggering the stopping member 14. For example, the extension part 318 and the stopping member 14 include respective gears 319 and 142, so that the sleeve 31 and the stopping member 14 are transmitted by means of mesh transmission.

In conclusion, the present invention provides a lock combining a combination lock mechanism with the key lock mechanism. Therefore, instead of only being unlocked by the combination lock mechanism, the lock of the present invention can also be unlocked by the key lock mechanism.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A combination lock having a second lock mechanism comprising:

a lock body comprising at least a push-button and a lock tongue in relation with each other, the lock tongue having a locking position and a releasing position;

a stopping member, positioned in the lock body, having a first position for constraining the lock tongue in the locking position and a second position for releasing constraint of the lock tongue;

a first lock mechanism comprising a plurality of dials and a shifting plate installed in the lock body, the shifting plate and the dials moving correspondingly, the shifting plate having a [clamping] *locking* position for [constraining] the stopping member *to move* to [remain in] the first position and a unlocking position for releasing the stopping member [from being constrained] *to the second position*; and a second lock mechanism comprising a sleeve and a linking member installed in the lock body and in relation with each other, the sleeve having a keyhole for allowing a key to be inserted and for being rotated by the key such that the linking member is shifted and forces the stopping member to change positions.

2. The combination lock of claim 1 wherein the linking member is coupled to an eccentric position of the sleeve at one end.

3. The combination lock of claim 1 wherein the sleeve and the linking member operate by means of mesh transmission.

4. The combination lock of claim 1 wherein the sleeve has a cam operatively connected to the linking member such that the sleeve and the linking member move correspondingly.

5. The combination lock of claim 4 wherein the linking member has a resilient member for providing a recovering ability such that the linking member and the cam remain in contact.

6. The combination lock of claim 1 wherein the stopping member is pivotally positioned in the lock body and is rotated for changing positions.

7. The combination lock of claim 6 wherein the linking member is coupled to an eccentric position of the stopping member.

8. The combination lock of claim 1 wherein the linking member is pivotally positioned in the lock body and the sleeve has a lever for moving the linking member.

9. A combination lock having a second lock mechanism comprising:

a lock body comprising at least a push-button and a lock tongue in relation with each other, the lock tongue having a locking position and a releasing position;

a stopping member, positioned in the lock body, having a first position for constraining the lock tongue in the locking position and a second position for releasing constraint of the lock tongue;

a first lock mechanism comprising a plurality of dials and a shifting plate installed in the lock body, the shifting plate and the dials moving correspondingly, the shifting plate having a [clamping] *locking* position for [constraining] the stopping member to [remain in] *move to* the first position and a unlocking position for releasing the stopping member [from being constrained] *to the second position*; and a second lock mechanism comprising a sleeve and a flexible transmission member positioned in the lock body, the sleeve having a keyhole for allowing a key to be inserted and for being rotated by the key, the flexible transmission member being respectively connected to the sleeve and the stopping member such that the sleeve [rotates] actuates the flexible transmission member and the stopping member simultaneously for changing positions of the stopping member.

10. The combination lock of claim 9 wherein the flexible transmission member is a generally circular member positioned around the sleeve and the stopping member.

11. The combination lock of claim 10 wherein the flexible transmission member, the sleeve, and the stopping member operate by means of mesh transmission.

12. The combination lock of claim 9 wherein the flexible transmission member is a linear belt respectively connected to the sleeve and the stopping member.

13. The combination lock of claim 9 wherein the flexible transmission member is modulated by a tension modulator.

14. A combination lock having a second lock mechanism comprising:

a lock body comprising at least a push-button and a lock tongue in relation with each other, the lock tongue having a locking position and a releasing position;

a stopping member, positioned in the lock body, having a first position for constraining the lock tongue in the locking position and a second position for releasing constraint of the lock tongue;

a first lock mechanism comprising a plurality of dials and a shifting plate installed in the lock body, the shifting plate and the dials moving correspondingly, the shifting plate having a [clamping] *locking* position for [constraining] the stopping member to [remain in] *move to* the first position and a unlocking position for releasing the stopping member [from being constrained] *to the second position*; and a sleeve, positioned in the lock body, having a keyhole for allowing a key to be inserted and for being rotated by the key, the sleeve further comprising an extension part for forcing the stopping member to change positions when the sleeve rotates.

15. The combination lock of claim 14 wherein the extension part and the stopping member operate by means of mesh transmission.

* * * * *